(12) United States Patent
Bosley et al.

(10) Patent No.: US 7,185,191 B2
(45) Date of Patent: Feb. 27, 2007

(54) UPDATABLE FIRMWARE HAVING BOOT AND/OR COMMUNICATION REDUNDANCY

(75) Inventors: Jonathan Edward Bosley, Tucson, AZ (US); Aaron Lyle Herring, Tucson, AZ (US); Daniel Scott Moore, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 10/839,482

(22) Filed: May 5, 2004

(65) Prior Publication Data

US 2005/0251673 A1    Nov. 10, 2005

(51) Int. Cl.
G06F 15/177 (2006.01)
G06F 9/445 (2006.01)

(52) U.S. Cl. .............. 713/2; 713/1; 713/100; 714/2; 714/36; 714/38; 714/42; 717/168; 717/169; 717/173

(58) Field of Classification Search .............. 713/1, 713/2, 100; 714/2, 36, 38, 48; 717/168, 717/169, 173
See application file for complete search history.

(56) References Cited

U.S. PATENT DOCUMENTS

| | | | |
|---|---|---|---|
| 6,560,703 B1 | 5/2003 | Goodman | 713/2 |
| 6,640,334 B1 | 10/2003 | Rasmussen | 717/171 |
| 6,668,374 B1 | 12/2003 | Sten et al. | 717/173 |
| 6,792,556 B1 * | 9/2004 | Dennis | 714/6 |
| 7,024,581 B1 * | 4/2006 | Wang et al. | 714/2 |
| 2002/0170050 A1 | 11/2002 | Fiorella, III et al. | 717/168 |
| 2002/0188886 A1 | 12/2002 | Liu et al. | 714/6 |
| 2003/0033512 A1 | 2/2003 | Austen et al. | 713/2 |
| 2003/0041182 A1 | 2/2003 | Martwick | 710/1 |
| 2003/0106052 A1 | 6/2003 | Morrison et al. | 717/170 |
| 2003/0204603 A1 | 10/2003 | Buchanan et al. | 709/228 |
| 2003/0217358 A1 | 11/2003 | Thurston et al. | 717/174 |
| 2003/0221092 A1 | 11/2003 | Ballard et al. | 713/1 |
| 2003/0236970 A1 | 12/2003 | Palmer et al. | 713/1 |

* cited by examiner

Primary Examiner—A. Elamin
Assistant Examiner—Nitin C. Patel
(74) Attorney, Agent, or Firm—John H. Holcombe

(57) ABSTRACT

A distributed nodal system with a source computer processor node storing program code for target node(s). A target node has an updatable firmware memory storing program code for operating a target processor. The target code comprises application code for controlling an embedded device, primary communication code for communicating with a network, backup communication code also having copy code for copying code between portions of the firmware memory, and primary boot code for booting the target processor and having check code. The check code determines whether the primary communication code is corrupted, and if it is corrupted, employs the copy code to overwrite the primary communication code with the backup code. If uncorrupted, the check code determines whether the application code is corrupted, and if corrupted, prevents execution of the code.

20 Claims, 7 Drawing Sheets

UPDATABLE FIRMWARE HAVING BOOT AND/OR COMMUNICATION REDUNDANCY

FIELD OF THE INVENTION

This invention relates to processor controlled embedded devices where a processor controls at least one operational element, and, more particularly, to handling upgrades and potential corruption of the firmware which operates the processor.

BACKGROUND OF THE INVENTION

In processor controlled embedded devices, the firmware for operating the processor may be updated to add functionality or obtain enhancements to existing functionality. During the process of updating firmware, the firmware image must be written to a firmware memory, which may comprise nonvolatile memory, such as NVRAM, flash memory, EEPROM, etc., as is known to those of skill in the art. If only one firmware image is stored in the firmware memory, the process of writing the firmware overwrites the existing firmware image. If the firmware update becomes corrupted, such as by incorrect transfer of data or being interrupted by a power cycle, etc., the only copy of the firmware is not usable, and the embedded device ceases to function. If the method of updating the firmware involved code in the firmware image that was corrupted, it is also no longer possible to correct the problem by updating the firmware again, and the embedded device with the corrupted firmware must be replaced.

One typical method of handling the issue is to provide two copies of substantially all of the firmware in the embedded device in one or more firmware memories. This provides robustness as one firmware image is left intact while the other is being updated, but at the cost of requiring firmware memory that is twice the firmware image size, which is a sizable cost impact to a typical embedded device.

Another strategy is to provide a source processor node with a great deal of nonvolatile memory in a network with embedded device target nodes. The embedded device target nodes comprise volatile memory, which is lower cost, for temporarily storing a firmware image. On power up or reset of the target embedded device processor, a small amount of firmware in a nonvolatile memory causes the processor to request the firmware image from the source processor node. The source processor node will have sufficient nonvolatile memory to handle updates to code images for the target embedded devices and to handle potential corruption to update images. The nonvolatile storage requirement for the target nodes is smaller and the system is robust to disturbances during firmware updates, but the power on time is greater, since the full firmware image does not reside on the target embedded device.

Another method is to store the full firmware image at the embedded device, as well as a fixed backup image. The backup image is simpler, is not changed, and is only used when the full firmware image is corrupted. If the full firmware image is corrupted, the backup image is used to provide operation of the embedded device, and may be used to update the full firmware image, either from a source node in the system or from an operator loading code from a maintenance interface. However, the backup image is only for backup and is not intended to be upgraded. Further, the boot section that determines whether the full code image or the backup image is to be used is also not intended to be upgraded. Because the boot section and the backup image cannot be updated, neither improvements to algorithms nor fixes to problems can be made to those sections. In addition, there can be no changes to the sizes of the boot section nor the backup image memory.

SUMMARY OF THE INVENTION

The present invention comprises a distributed nodal system, a processor for a processor controlled embedded device, and a computer program product.

In one embodiment of a distributed nodal system, a source computer processor node comprises a computer processor having an interface for communicating with a network; and at least one nonvolatile memory storing computer readable program code for at least one target computer processor node.

A target computer processor node for a processor controlled embedded device comprises a computer processor for controlling at least one operational element; an interface for communicating with a network; and an updatable firmware memory storing computer readable program code for operating the target computer processor.

The computer readable program code at the target comprises:

application computer readable program code for causing the target computer processor to control the at least one operational element;

primary communication computer readable program code for causing the target computer processor to communicate with the network;

backup communication computer readable program code capable of causing the target computer processor to communicate with the network; the backup communication computer readable program code having copy code for causing the target computer processor to copy computer readable program code from one portion of the updatable firmware memory to another portion of the updatable firmware memory; and primary boot computer readable program code for causing the target computer processor to boot the target computer processor; the primary boot computer readable program code having check code causing the target computer processor to determine whether the primary communication computer readable program code is corrupted; and if the primary communication computer readable program code is determined to be corrupted, to employ the copy code of the backup communication computer readable program code to cause the target computer processor to copy at least a portion of the backup communication computer readable program code to, and overwrite, at least a portion of the primary communication computer readable program code;

else, if the primary communication computer readable program code is determined to be uncorrupted, to determine whether the application computer readable program code is corrupted;

if the application computer readable program code is determined to be uncorrupted, to set a flag indicating that the application computer readable program code is uncorrupted;

else, if the application computer readable program code is determined to be corrupted, to prevent execution of the application computer readable program code, and to employ the primary communication computer readable program code to send a signal to the source computer processor node via the network, whereby the computer processor of the source computer processor node responds to the signal and provides a copy of the computer readable program code for the target computer processor node via the network.

Thus, only a small amount of the code image is backup code, conserving nonvolatile firmware memory, and the processor controlled embedded device continues to be operational despite corruption within the code image and/or updates.

In a further embodiment, a processor system for a processor controlled embedded device comprises a computer processor for controlling at least one operational element; and an updatable firmware memory storing computer readable program code for operating the computer processor. The computer readable program code comprises:

application computer readable program code for causing the computer processor to control the operational element(s);

primary communication computer readable program code for causing the computer processor to communicate externally with respect to the processor controlled embedded device;

backup communication computer readable program code capable of causing the computer processor to communicate externally with respect to the processor controlled embedded device; the backup communication computer readable program code having copy code for causing the computer processor to copy computer readable program code from one portion of the updatable firmware memory to another portion of the updatable firmware memory; and primary boot computer readable program code for causing the computer processor to boot the processor system; the primary boot computer readable program code having check code causing the computer processor to determine whether the primary communication computer readable program code is corrupted; and if the primary communication computer readable program code is determined to be uncorrupted, to determine whether the application computer readable program code is corrupted;

else, if the primary communication computer readable program code is determined to be corrupted, to employ the copy code of the backup communication computer readable program code to cause the computer processor to copy at least a portion of the backup communication computer readable program code to, and overwrite, at least a portion of the primary communication computer readable program code.

In another embodiment, the copy code of the backup communication computer readable program code additionally comprises computer readable program code causing the computer processor, after the backup communication computer readable program code has been copied to the primary communication computer readable program code, to cause a reset of the computer processor.

In still another embodiment, the primary communication computer readable program code for causing the computer processor to communicate externally with respect to the processor controlled embedded device causes the computer processor to receive an update to the application computer readable program code, and to update and overwrite at least a portion of the application computer readable program code; and the primary communication computer readable program code causes the computer processor to employ the check code of the primary boot computer readable program code to determine whether the updated application computer readable program code is corrupted.

In a further embodiment, the primary communication computer readable program code causes the computer processor to receive an update to communication computer readable program code, and to update and overwrite at least a portion of the backup communication computer readable program code with the update. Further, the primary communication computer readable program code causes the computer processor to employ the check code of the primary boot computer readable program code to determine whether the updated backup communication computer readable program code is corrupted; and the primary boot computer readable program code, if the updated backup communication computer readable program code is determined to be uncorrupted, causes the computer processor to determine whether the updated backup communication computer readable program code comprises a new version, and, if the updated backup communication computer readable program code comprises a new version, to employ copy code of the updated backup communication computer readable program code to cause the computer processor to copy at least a portion of the backup communication computer readable program code to, and overwrite, at least a portion of the primary communication computer readable program code.

In another embodiment, backup boot computer readable program code for causing the computer processor to boot the processor system is additionally provided, and the primary communication computer readable program code causes the computer processor to receive an update to boot computer readable program code, and to update and overwrite at least a portion of the backup boot computer readable program code with the update; and the primary communication computer readable program code causes the computer processor to employ the check code of the primary boot computer readable program code to determine whether the updated backup boot computer readable program code is corrupted; and the primary boot computer readable program code, if the primary communication computer readable program code is determined to be uncorrupted, causes the computer processor to determine whether the updated backup boot computer readable program code comprises a new version, and, if the updated backup boot computer readable program code comprises a new version, to employ copy code of the primary and/or the backup communication computer readable program code to cause the computer processor to copy at least a portion of the backup boot computer readable program code to, and overwrite, at least a portion of the primary boot computer readable program code.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
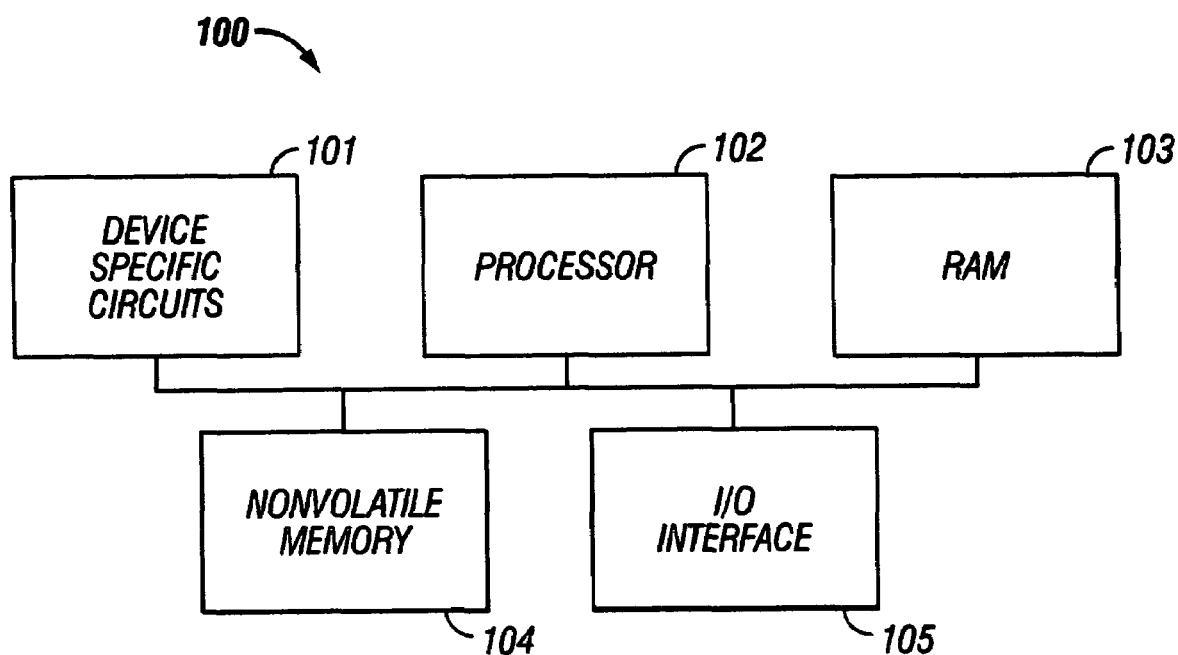
FIG. 1 is a block diagrammatic illustration of an embodiment of a processor controlled embedded device which implements the present invention.

Referring to FIG. 1, an example of a processor controlled embedded device 100 is illustrated, such as an embedded device which implements specialized functions or service. Examples of embedded devices are modems, answering machines, automobile controls, disk drives, tape drives, digital cameras, medical drug infusion systems, and storage automation products to control accessors or provide communications. The embedded device 100 is illustrated with a computer processor 102, optional RAM (Random Access Memory) 103, an updatable firmware memory 104, device specific circuits of at least one operational element 101, and an interface 105. Herein, the device specific circuits for the operational element(s) will be discussed as operational element 101. The computer processor 102 may be an off-the-shelf microprocessor, custom processor, FPGA (Field Programmable Gate Array), ASIC (Application Specific Integrated Circuit), discrete logic, etc., as are known to those of skill in the art. The updatable firmware memory 104 comprises a rewritable nonvolatile memory and holds the executable computer readable program code and may hold any nonvolatile data for the computer processor 102, and may comprise ROM (Read Only Memory), EEPROM (Electrically Erasable Programmable Read Only Memory), PROM (Programmable Read Only Memory), flash PROM (Programmable Read-Only Memory), battery backup RAM, MRAM (Magnetoresistive Random Access Memory, hard disk drive, and other of many types of rewritable nonvolatile memory that are also known to those of skill in the art. One or more nonvolatile memories may comprise the updatable firmware memory 104. The interface 105 is some form of communication interface that allows the computer processor 102 to communicate with the outside world. Examples may include serial interfaces, such as RS-232 or USB (Universal Serial Bus), Conroller Area Network (CAN), SCSI (Small Computer Systems Interface), Ethernet, Fibre Channel interfaces, wireless, etc. The operational element 101 provides additional hardware to enable an embedded system 100 to perform specific functions such as actuator control of a vehicle anti-lock braking system, motor control of an accessor for an automated data storage library, etc. The device specific circuits of the operational element 101 may comprise electronics that provide Pulse Width Modulation (PWM) control, Analog to Digital Conversion (ADC), Digital to Analog Conversion (DAC), Liquid Crystal Display (LCD) controller, etc. Any of the elements of FIG. 1 may be combined into one or more components, for example, the updatable firmware memory 104, RAM 103, operational element 101 and/or interface 105 may comprise components of the processor 102. In addition, all or part of the operational element 101 may reside outside the controller 100.

Figure 2:
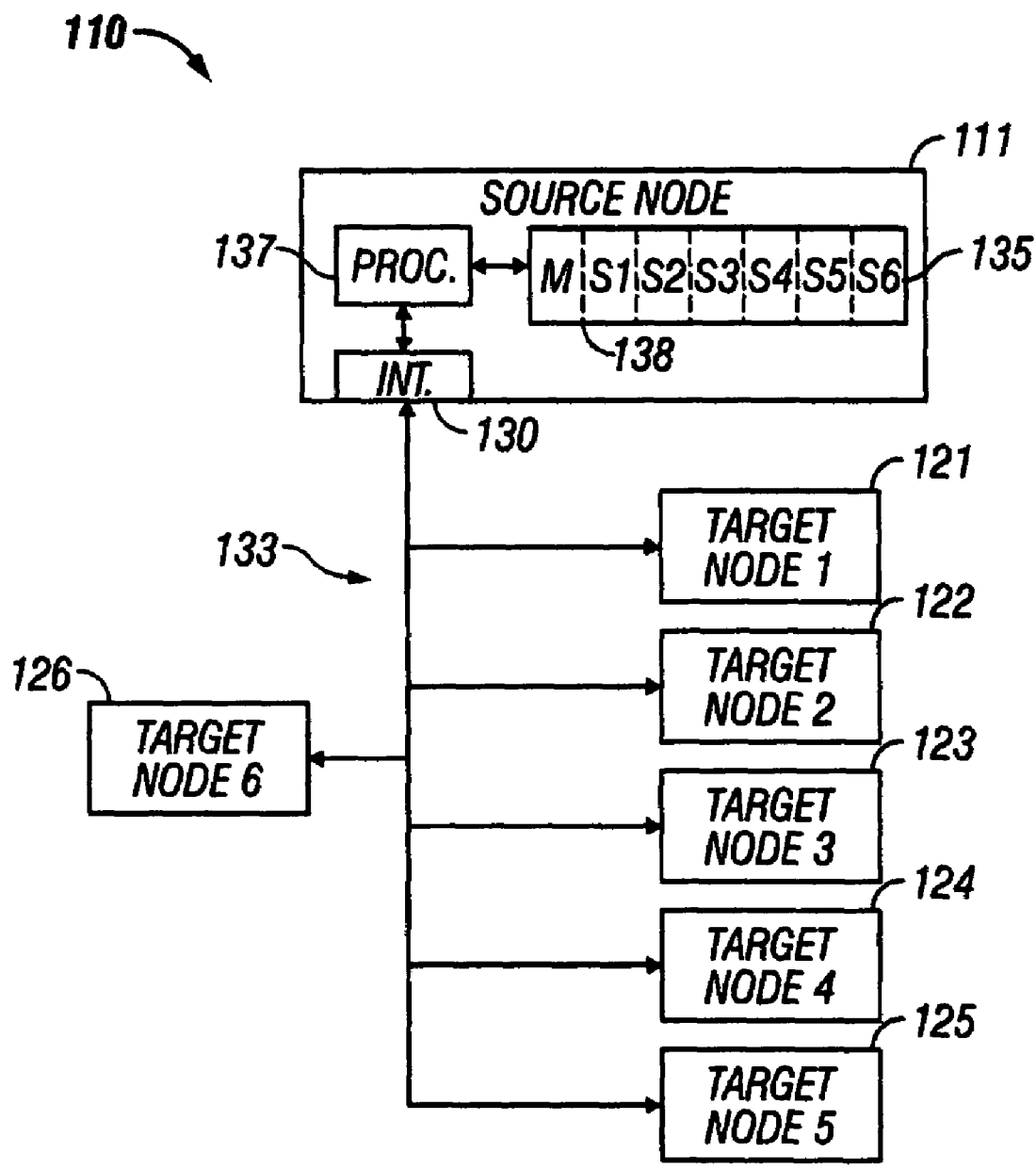
FIG. 2 is a block diagrammatic illustration of a distributed nodal system with a source computer processor node and a plurality of target processor controlled embedded devices of FIG. 1.

FIG. 2 illustrates an embodiment of a distributed nodal system 110 with a source computer processor node 111 and target processor controlled embedded devices 121, 122, 123, 124, 125 and 126. One or more, or all, of the target processor controlled embedded devices comprises a processor controlled embedded device of FIG. 1. The embodiment of a source computer processor node 111 of FIG. 1 comprises an interface 130 for communicating with a network 133; and at least one nonvolatile memory 135 for storing computer readable program code for at least one target computer processor node. In the example, the nonvolatile memory 135 stores code images for each of the target computer processor nodes. The nonvolatile memory 135 may comprise ROM (Read Only Memory), EEPROM (Electrically Erasable Programmable Read Only Memory), PROM (Programmable Read Only Memory), flash PROM (Programmable Read-Only Memory), battery backup RAM, MRAM (Magnetoresistive Random Access Memory), hard disk drive, and other of many types of nonvolatile memory that are also known to those of skill in the art. The interface 130 is arranged to communicate with the network 133 which comprises some form of communication within the system 110. Examples may include serial interfaces, such as RS-232 or USB (Universal Serial Bus), Controller Area Network (CAN), SCSI (Small Computer Systems Interface), Ethernet, Fibre Channel interfaces, wireless, etc. A source processor 137 may be provided and comprises an off-the-shelf microprocessor, custom processor, FPGA (Field Programmable Gate Array), ASIC (Application Specific Integrate Circuit), discrete logic, etc., as are known to those of skill in the art. The nonvolatile memory 135 may hold executable computer readable program code 138, and may hold any nonvolatile data, for the computer processor 137. Alternatively, the executable computer readable program code 138 of computer processor 137 may be maintained by storage of the processor.

Figure 3:
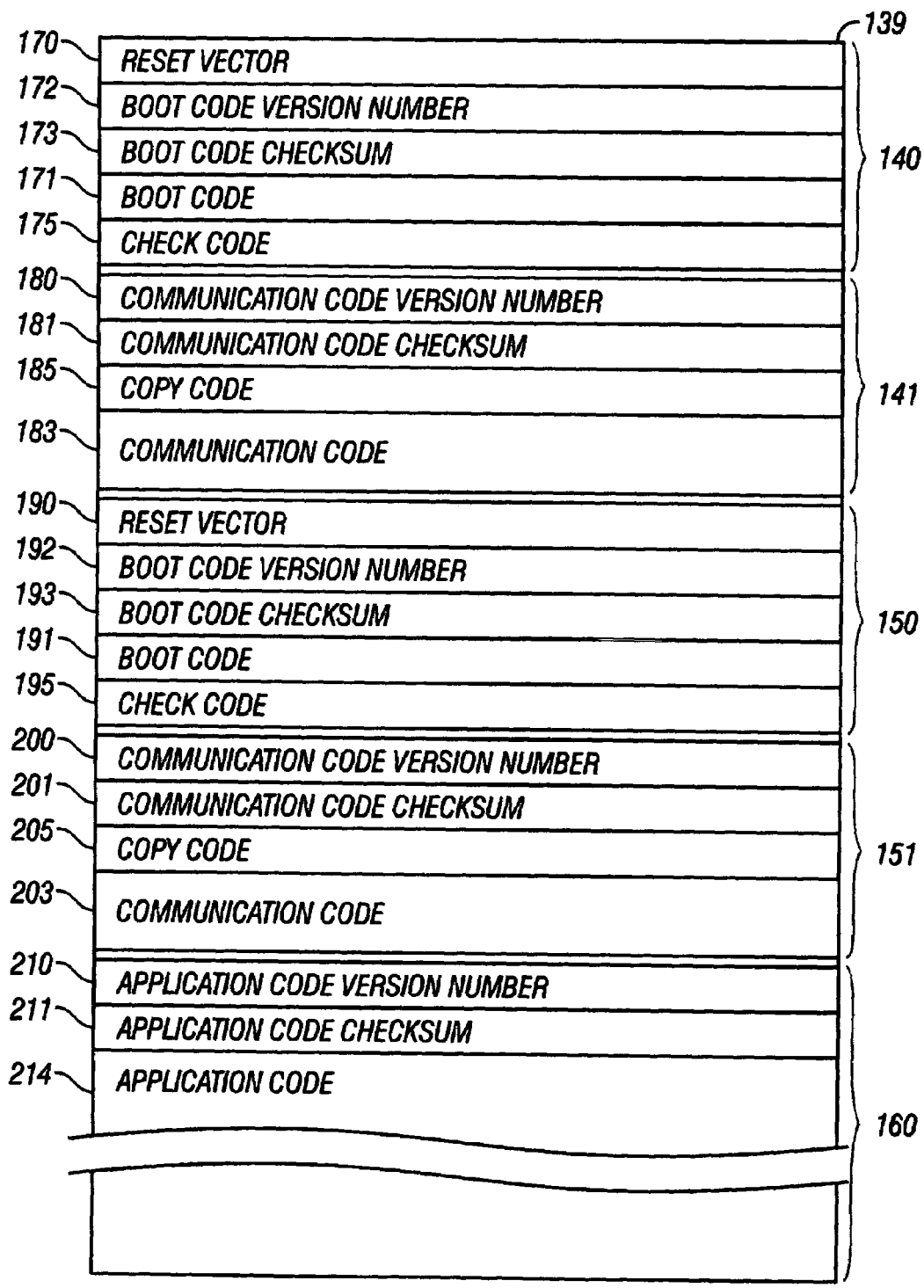
FIG. 3 is a diagrammatic illustration of an embodiment of an updatable firmware memory storing computer readable program code of FIG. 1 in accordance with the present invention.

FIG. 3 illustrates an embodiment of a code image 139 of computer readable program code of the updatable firmware memory 104 for the processor controlled embedded device 100 of FIG. 1. The code image comprises primary boot computer readable program code 140 for causing the computer processor 102 to boot the processor system, primary communication computer readable program code 141 for causing the computer processor 102 to communicate externally with respect to the processor controlled embedded device, backup boot computer readable program code 150, backup communication computer readable program code 151, and application computer readable program code 160 for causing the computer processor 102 to control the operational element 101.

In the example of FIG. 3, a reset vector 170 is shown as part of the primary boot code 140, but actually comprises a reset vector to "go to boot code start" forming the initiation of the boot code 171 which causes the computer processor to boot the processor system. The primary boot code additionally comprises a version number 172 and a checksum 173. As is known by those of skill in the art, checksums are produced by error checking algorithms to allow a similar algorithm to read a section of code to determine whether the code is corrupted. The primary boot code additionally comprises check code 175 which causes the computer processor to check selected code with respect to its checksum to determine whether the checked code is corrupted.

The primary communication computer readable program code 141 comprises a version number 180 and a checksum 181, such as discussed above. Communication code 183 provides the code for causing the computer processor to communicate externally with respect to the processor controlled embedded device, and for receiving a code update. Further, the primary communication code 141 may comprise copy code 185. In accordance with an embodiment of the present invention, copy code only executes from the backup communication computer readable program code 151, and the copy code 185 is only provided if the entirety of the backup communication code 151 and primary communication code 141 cover substantially the same totality of subject matter. The communication code could also have some control over the operational element.

Backup boot computer readable program code 150 may cover the same totality of subject matter as the primary boot computer readable program code 140, and is also for causing the computer processor 102 of FIG. 1 to boot the processor system. In the example of FIG. 3, reset vector 190 comprises a vector to "go to boot code start" forming the initiation of the boot code 191 which causes the computer processor to boot the processor system. The backup boot code additionally comprises a version number 192 and a checksum 193, as was discussed above. The backup boot code 150 additionally comprises check code 195 which causes the computer processor to check a checksum of selected code to determine whether the checked code is corrupted.

The backup communication computer readable program code 151 comprises a version number 200 and a checksum 201, such as discussed above. Communication code 203 provides the code for causing the computer processor to communicate externally with respect to the processor controlled embedded device, and for receiving a code update. The backup communication code 151, in accordance with the present invention, comprises copy code 205. The copy code 205 executes in the backup communication code image and copies information from a backup code image to a primary code image in the firmware memory 104 in FIG. 1.

Optionally, the primary communication code 141 and backup code 151 may comprise check code the same as or similar to the check code 175 of the primary boot code 140. Herein, reference to the check code of the primary boot code may additionally or alternatively refer to check code of the primary communication code.

In FIG. 3, the application computer readable program code 160 causes the computer processor 102 to control the operational element 101 of FIG. 1. The code 160 of FIG. 3 comprises an application code version number 210 and checksum 211, similar to that discussed above, and comprises application code, which occupies the majority of the firmware memory, and comprises the instructions that causes the computer processor 102 to control the operational element 101 of FIG. 1.

Thus, only a small amount 150, 151 of the code image 139 is backup code, conserving nonvolatile firmware memory 104 of FIG. 1.

Figure 4A:
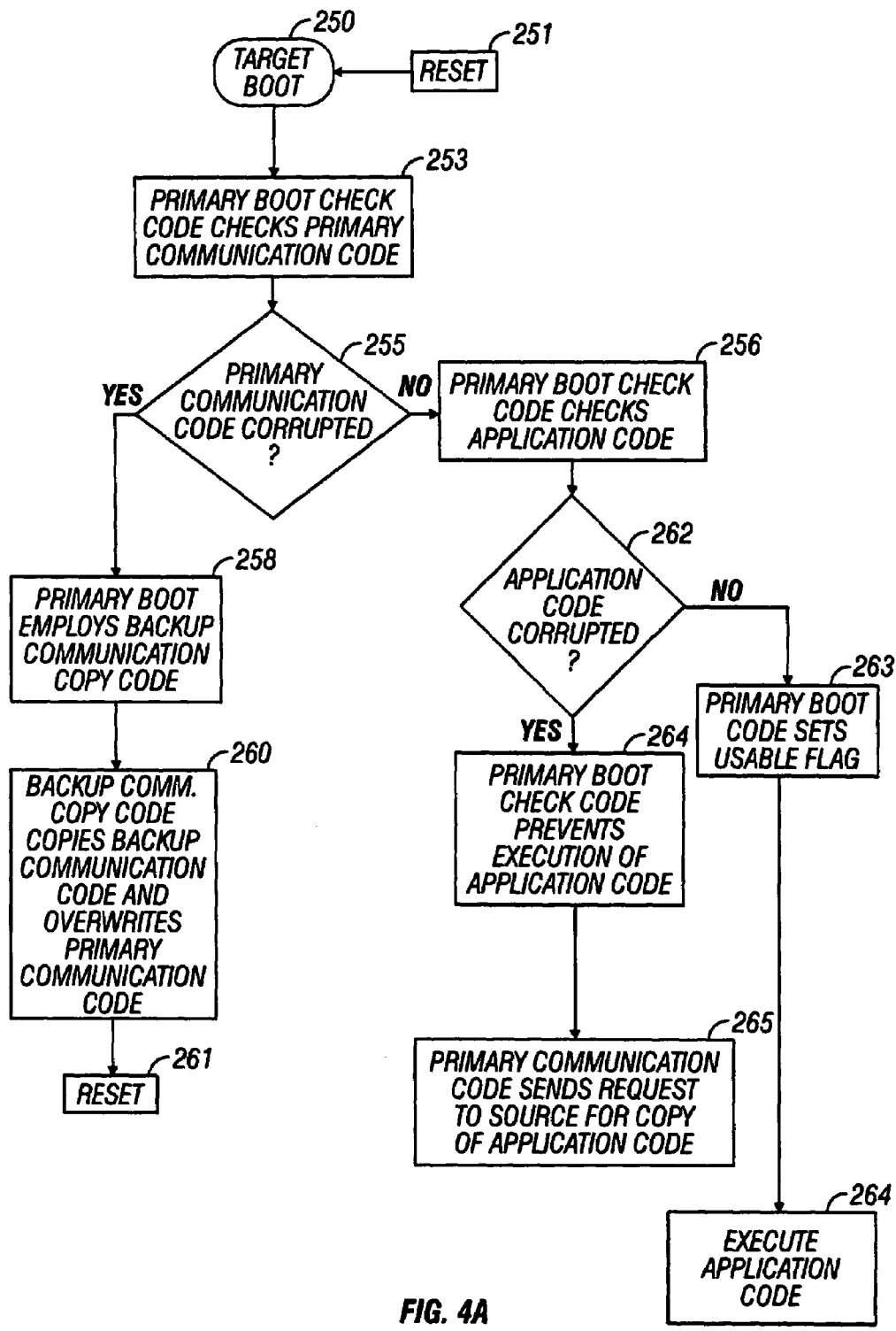
FIGS. 4A, 4B, 4C and 4D are flow charts depicting an embodiment of the present invention for checking, providing backup for, and updating the computer readable program code of FIG. 3.
Figure 4B:
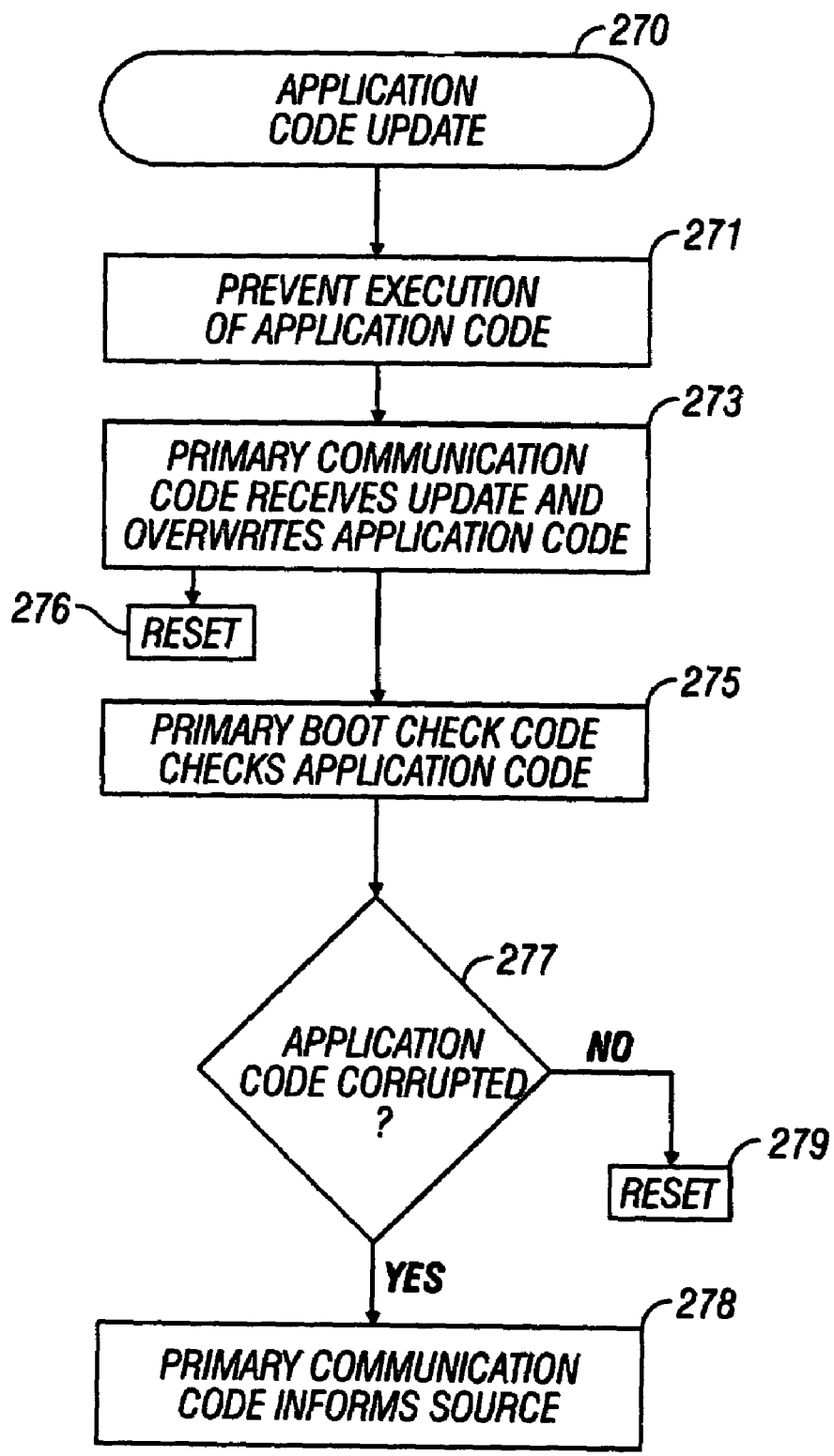
Figure 4C:
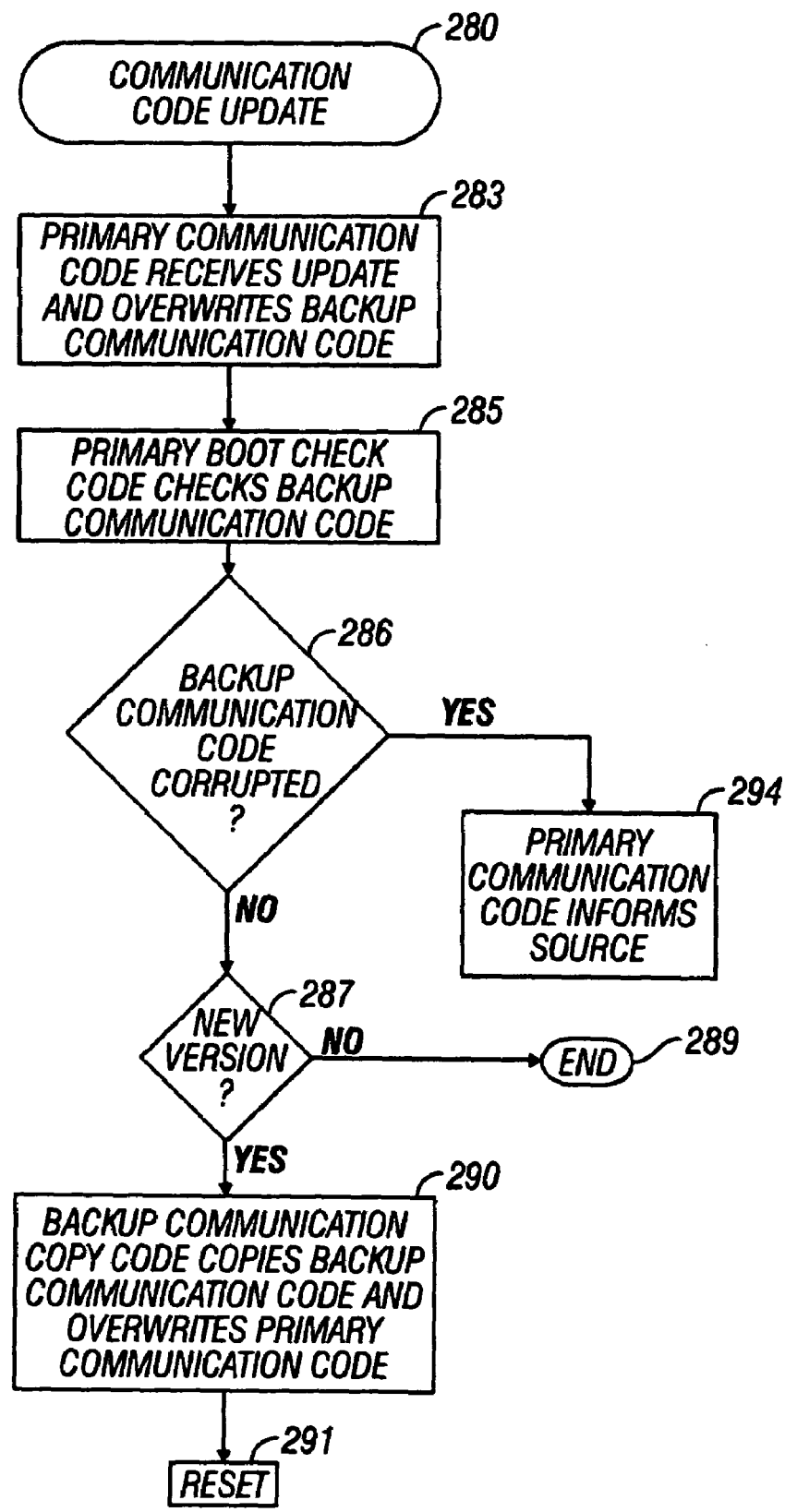
Figure 4D:
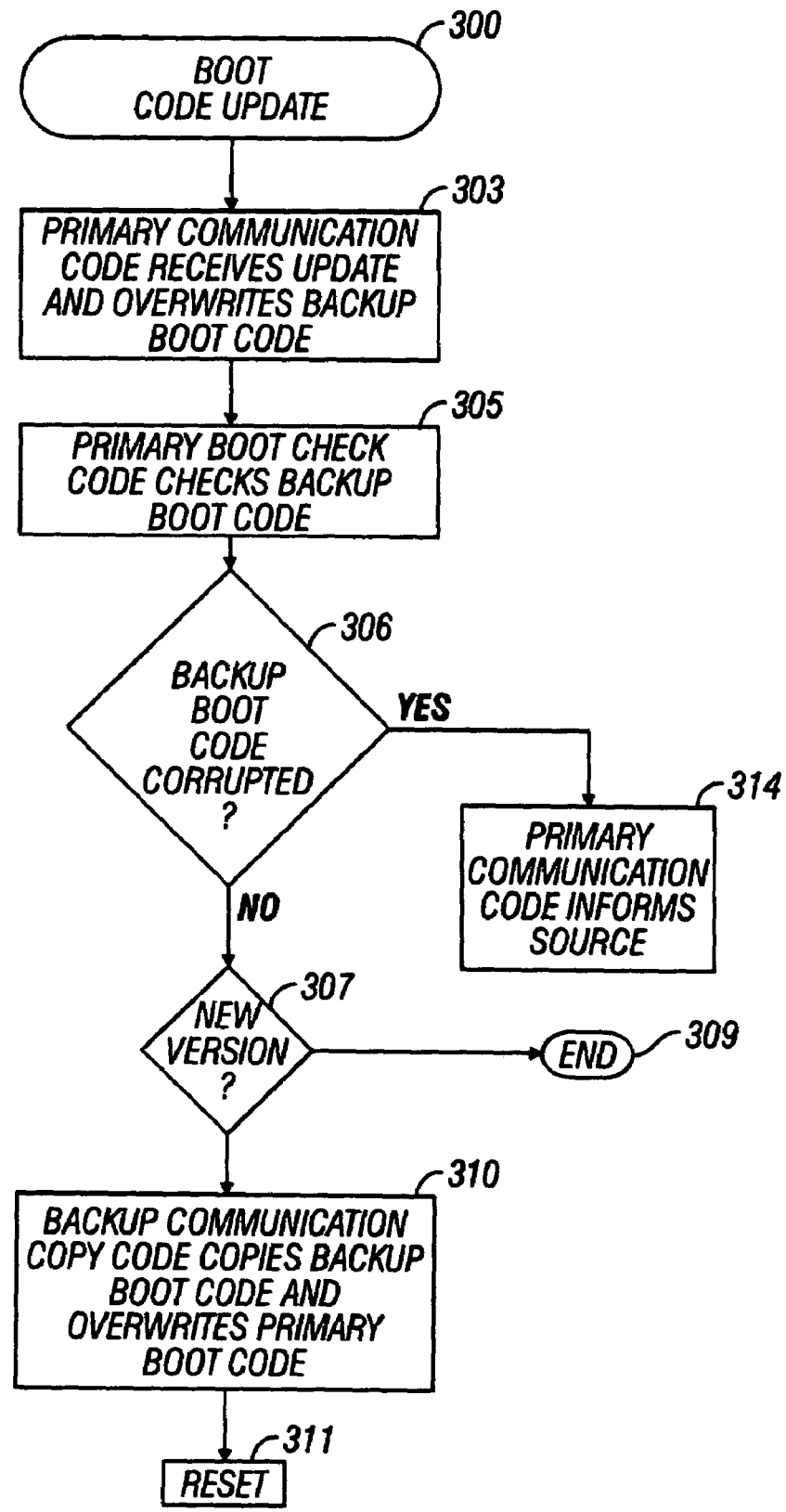

An embodiment of a computer implemented version of the present invention is illustrated in FIG. 4A, in which step 250 accesses the primary boot computer readable program code 140 of FIG. 3 for causing the computer processor 102 of FIG. 1 to boot the processor system 100. The computer processor may be booted as the result of a power on, or as the result of a reset vector 251 from code within the system.

Referring to FIGS. 1, 3 and 4A, as shown by step 253, the primary boot computer readable program code has check code 175, which is employed to cause the computer processor 102 to determine whether the primary communication computer readable program code 141 is corrupted, for example, by checking the communication code with respect to its checksum 181.

If, in step 255, the primary communication computer readable program code is determined to be uncorrupted, "NO" in step 255, the check code 175 is employed in step 256 to determine whether the application computer readable program code is corrupted.

Else, if in step 255, the primary communication computer readable program code is determined to be corrupted, the copy code 205 of the backup communication computer readable program code 151 is called in step 258 by the primary boot code. In step 260, the copy code 205 causes the computer processor to copy at least a portion of the backup communication computer readable program code 151 to, and overwrite, at least a portion of the primary communication computer readable program code. The communication computer readable program code is a relatively small amount of code and the primary communication code may be totally overwritten by the totality of the backup communication code. Upon completion of the overwrite of the primary communication code, the reset 170 is employed in step 261 such that the primary boot code 140 may reset the processor, for example in step 251.

At step 256, where, if in step 255 the primary communication computer readable program code was determined to be uncorrupted, the check code 175 is employed to determine whether the application computer readable program code 160 is corrupted, for example by checking the application code with respect to its checksum 211.

If, in step 262, the application computer readable program code is determined to be uncorrupted, the primary boot code, in step 263, sets a flag indicating that the application computer readable program code 160 is uncorrupted. Then, in step 264, the application code is executed.

Else, if in step 262, the application computer readable program code 160 is determined to be corrupted, the primary boot check code 175, in step 264, prevents execution of the application computer readable program code 160. In one embodiment, this is accomplished by the primary boot check code 175 clearing the flag that indicates that the application code 160 is uncorrupted.

Referring additionally to FIG. 2, wherein the processor controlled embedded device 100 of FIG. 1 comprises one of the target processor controlled embedded devices 121, 122, 123, 124, 125 and 126, also called target nodes, the primary boot check code 175 of FIG. 3, in step 265 calls the primary communication computer readable program code 141 to send a request signal at the target interface 105 of FIG. 1 to the source computer processor node 111 of FIG. 2 via the network 133. The request signal is for a copy of the application code for the particular target node. The source computer processor node 111 receives the request at interface 130, and the computer processor 137 responds to the signal and provides a copy of the application computer readable program code for the target computer processor node from the nonvolatile memory 135 at the source interface 130. In another embodiment, the target node does not request a copy of the application code, and instead, the source node requests information from the target node, and the response from target node contains information that indicates that the application code is corrupt.

Referring to FIGS. 1, 2, 3 and 4B, receipt of application computer readable program code begins at step 270. Step 270 also represents receipt of an update or of overwrite code for the application code 160, whether received over a network, or provided directly to the embedded device or its processor 102. In one example, in step 273, the primary communication code 183 operates the computer processor 102 to receive application computer readable program code from the source computer processor node via the network 133 at the target interface 105. The primary communication code updates and overwrites at least a portion of the application computer readable program code 160. If the application code executes from the same nonvolatile memory that is being overwritten by the new application code image, the processor 102 should not execute the application code 160 while an update to the application code is being written to the nonvolatile memory. This is shown as optional step 271 in which the primary communication code 183 prevents execution of the application code 160. In one embodiment, this is accomplished by clearing the flag that indicates that the application code 160 is uncorrupted. Then, in one embodiment, in step 275, the primary communication computer readable program code causes the computer processor 102 to employ the check code 175 of the primary boot computer readable program code to determine whether the updated application computer readable program code is corrupted. The employ of the check code may be accomplished directly in step 275, or by means of step 276, which causes a reset such that the primary boot code 140 may reset the processor, for example, in step 251 of FIG. 4A. The reset of the processor leads to step 256 in which the check code 175 of the primary boot computer readable program code determines whether the updated application computer readable program code is corrupted.

Referring to FIGS. 1, 2, 3 and 4B, in the embodiment of step 275, if, in step 277, the check code 175 of the primary boot computer readable program code determines that the updated application computer readable program code is corrupted, in step 278, the primary communication code 183 optionally informs the source computer processor node 111 that the update failed. If, in step 277, the check code 175 of the primary boot computer readable program code determines that the updated application computer readable program code is uncorrupted, the application code is implemented by resetting the computer processor in step 279, such that the primary boot code 140 may reset the processor, for example, in step 251 of FIG. 4A.

Referring to FIGS. 1, 2, 3 and 4C, an update to the communication computer readable program code begins at step 280. In step 283, the primary communication computer readable program code 183 causes the computer processor 102 to receive the update to communication computer readable program code, and to update and overwrite at least a portion of the backup communication computer readable program code 151 with the update. In step 285, the primary communication computer readable program code 183 causes the computer processor 102 to employ the check code 175 of the primary boot computer readable program code 140 to determine whether the updated backup communication computer readable program code 151 is corrupted, for example, by checking the code with respect to its checksum 201. If, in step 286, the primary boot computer readable program code determines that the updated backup communication computer readable program code is uncorrupted, the primary boot computer readable program code causes the computer processor, in step 287, to determine whether the updated backup communication computer readable program code comprises a new version. The determination is made by comparing the version number 180 of the primary communication code 141 to the version number 200 of the backup communication code 151. If not, the process may end at step 289 with the primary and backup communication code considered the same as being the same version. This would occur, for example, if blanket updates were made to the communication code of all of the target nodes 121, 122, 123, 124, 125 and 126. If step 287 determines that the updated backup communication computer readable program code comprises a new version, in step 290, the primary communication code 183 operates the computer processor 102 to employ the copy code 205 of the updated backup communication computer readable program code 151. The copy code 205 causes the computer processor 102 to copy at least a portion of the backup communication computer readable program code 151 to, and overwrite, at least a portion of the primary communication computer readable program code 141. In step 291, a reset is caused to reset the computer processor to implement the updated primary communication computer readable program code 141, for example in step 251 of FIG. 4A. If, in step 286, the check code 175 of the primary boot computer readable program code determines that the updated backup communication computer readable program code is corrupted, in step 294, the primary communication code 183 optionally informs the source computer processor node 111 that the update failed.

Referring to FIGS. 1, 2, 3 and 4D, an update to the boot computer readable program code begins at step 300. This procedure is likely to be relatively rare in that the boot code is not usually updated. In step 303, the primary communication computer readable program code 183 causes the computer processor 102 to receive the update to the boot computer readable program code, and to update and overwrite at least a portion of the backup boot computer readable program code 150 with the update. In step 305, the primary communication computer readable program code 183 causes the computer processor 102 to employ the check code 175 of the primary boot computer readable program code 140 to determine whether the updated backup boot computer readable program code 150 is corrupted, for example, by checking the code with respect to its checksum 193. If, in step 306, the primary boot computer readable program code determines that the updated backup boot computer readable program code is uncorrupted, the primary boot computer readable program code causes the computer processor, in step 307, to determine whether the updated backup boot computer readable program code comprises a new version. The determination is made by comparing the version number 172 of the primary boot code 140 to the version number 192 of the backup boot code 150. If not, the process may end at step 309 with the primary and backup boot code considered the same as being the same version. This would occur, for example, if updates were made to the boot code of all of the target nodes 121, 122, 123, 124, 125 and 126. If step 307 determines that the updated backup communication computer readable program code comprises a new version, in step 310, the primary communication code 183 operates the computer processor 102 to employ the copy code 205 of the backup communication computer readable program code 151. The copy code 205 causes the computer processor 102 to copy at least a portion of the backup boot computer readable program code 150 to, and overwrite, at least a portion of the primary boot computer readable program code 140. In step 311, a reset is caused to reset the computer processor to implement the updated primary boot computer readable program code 140, for example in step 251 of FIG. 4A. If, in step 306, the check code 175 of the non-updated primary boot computer readable program code determines that the updated backup boot computer readable program code is corrupted, in step 314, the primary communication code 183 optionally informs the source computer processor node 111 that the update failed.

The illustrated components of the processor controlled embedded devices of FIGS. 1 and 2, the distributed nodal system of FIG. 4, and the arrangement of the code image of FIG. 3 may be varied, combined, or combined functions may be separated, as is known to those of skill in the art. The illustrated computer-implemented steps of FIGS. 4A, 4B, 4C and 4D may be altered in sequence, omitted, or other steps added, as is known to those of skill in the art. For example, updates to the boot, communication, and application code could all be received at one time. All checksums and version numbers would be checked and, if necessary, the copy code 205 of FIG. 3 would be employed to copy any necessary portions of the backup boot and backup communication code to overwrite other portions of the primary boot and/or primary communication code.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A processor system for a processor controlled embedded device, said embedded device comprising at least one operational element, said processor system comprising:
   a computer processor for controlling said at least one operational element; and
   an updatable firmware memory storing computer readable program code for operating said computer processor, said computer readable program code comprising:
      application computer readable program code for causing said computer processor to control said at least one operational element;
      primary communication computer readable program code for causing said computer processor to communicate externally with respect to said processor controlled embedded device;
      backup communication computer readable program code capable of causing said computer processor to communicate externally with respect to said processor controlled embedded device; said backup communication computer readable program code having copy code for causing said computer processor to copy computer readable program code from one portion of said updatable firmware memory to another portion of said updatable firmware memory; and
      primary boot computer readable program code for causing said computer processor to boot said processor system; said primary boot computer readable program code having check code causing said computer processor to determine whether said primary communication computer readable program code is corrupted; and
      if said primary communication computer readable program code is determined to be uncorrupted, to determine whether said application computer readable program code is corrupted;
      else, if said primary communication computer readable program code is determined to be corrupted, to employ said copy code of said backup communication computer readable program code to cause said computer processor to copy at least a portion of said backup communication computer readable program code to, and overwrite, at least a portion of said primary communication computer readable program code.

2. The processor system of claim 1, wherein said check code of said primary boot computer readable program code for causing said computer processor to determine whether said application computer readable program code is corrupted, additionally comprises computer readable program code causing said computer processor:

if said application computer readable program code is determined to be uncorrupted, to set a flag indicating that said application computer readable program code is uncorrupted;
   else, if said application computer readable program code is determined to be corrupted, to prevent execution of said application computer readable program code.

3. The processor system of claim 1, wherein said copy code of said backup communication computer readable program code additionally comprises computer readable program code causing said computer processor:
   after said at least a portion of said backup communication computer readable program code has been copied to said at least a portion of said primary communication computer readable program code, to cause a reset of said computer processor.

4. The processor system of claim 1, wherein:
   said primary communication computer readable program code for causing said computer processor to communicate externally with respect to said processor controlled embedded device causes said computer processor to receive an update to said application computer readable program code, and to update and overwrite at least a portion of said application computer readable program code; and
   said primary communication computer readable program code causes said computer processor to employ said check code of said primary boot computer readable program code to determine whether said updated application computer readable program code is corrupted.

5. The processor system of claim 1, wherein:
   said primary communication computer readable program code for causing said computer processor to communicate externally with respect to said processor controlled embedded device causes said computer processor to receive an update to communication computer readable program code, and to update and overwrite at least a portion of said backup communication computer readable program code with said update.

6. The processor system of claim 5, wherein:
   said primary communication computer readable program code causes said computer processor to employ said check code of said primary boot computer readable program code to determine whether said updated backup communication computer readable program code is corrupted; and
   said primary boot computer readable program code, if said updated backup communication computer readable program code is determined to be uncorrupted, causes said computer processor to determine whether said updated backup communication computer readable program code comprises a new version, and, if said updated backup communication computer readable program code comprises a new version, to employ copy code of said updated backup communication computer readable program code to cause said computer processor to copy at least a portion of said backup communication computer readable program code to, and overwrite, at least a portion of said primary communication computer readable program code.

7. The processor system of claim 1, additionally comprising:
   backup boot computer readable program code capable of causing said computer processor to boot said processor system; and wherein:
said primary communication computer readable program code for causing said computer processor to communicate externally with respect to said processor controlled embedded device causes said computer processor to receive an update to boot computer readable program code, and to update and overwrite at least a portion of said backup boot computer readable program code with said update; and said primary communication computer readable program code causes said computer processor to employ said check code of said primary boot computer readable program code to determine whether said updated backup boot computer readable program code is corrupted; and said primary boot computer readable program code, if said backup boot communication computer readable program code is determined to be uncorrupted, causes said computer processor to determine whether said updated backup boot computer readable program code comprises a new version, and, if said updated backup boot computer readable program code comprises a new version, to employ copy code of said primary and/or said backup communication computer readable program code to cause said computer processor to copy at least a portion of said backup boot computer readable program code to, and overwrite, at least a portion of said primary boot computer readable program code.

8. A computer program product tangibly embodied in non-volatile memory usable with a programmable computer processor having computer readable code embodied therein, said programmable computer processor for controlling at least one operational element of a processor controlled embedded device, said embedded device additionally comprising an updatable firmware memory storing computer readable program code, said computer program product comprising:

application computer readable program code for causing said programmable computer processor to control said at least one operational element;

primary communication computer readable program code for causing said programmable computer processor to communicate externally with respect to said processor controlled embedded device;

backup communication computer readable program code capable of causing said programmable computer processor to communicate externally with respect to said processor controlled embedded device; said backup communication computer readable program code having copy code for causing said programmable computer processor to copy computer readable program code from one portion of said updatable firmware memory to another portion of said updatable firmware memory; and primary boot computer readable program code for causing said programmable computer processor to boot said processor system; said primary boot computer readable program code having check code causing said programmable computer processor to determine whether said primary communication computer readable program code is corrupted; and if said primary communication computer readable program code is determined to be uncorrupted, to determine whether said application computer readable program code is corrupted;

else, if said primary communication computer readable program code is determined to be corrupted, to employ said copy code of said backup communication computer readable program code to cause said programmable computer processor to copy at least a portion of said backup communication computer readable program code to, and overwrite, at least a portion of said primary communication computer readable program code.

9. The computer program product tangibly embodied in non-volatile memory of claim 8, wherein said check code of said primary boot computer readable program code for causing said programmable computer processor to determine whether said application computer readable program code is corrupted, additionally comprises computer readable program code causing said programmable computer processor:

if said application computer readable program code is determined to be uncorrupted, to set a flag indicating that said application computer readable program code is uncorrupted;

else, if said application computer readable program code is determined to be corrupted, to prevent execution of said application computer readable program code.

10. The computer program product tangibly embodied in non-volatile memory of claim 8, wherein said copy code of said backup communication computer readable program code additionally comprises computer readable program code causing said programmable computer processor:

after said at least a portion of said backup communication computer readable program code has been copied to said at least a portion of said primary communication computer readable program code, to cause a reset of said programmable computer processor.

11. The computer program product tangibly embodied in non-volatile memory of claim 8, wherein:

said primary communication computer readable program code for causing said programmable computer processor to communicate externally with respect to said processor controlled embedded device causes said programmable computer processor to receive an update to said application computer readable program code, and to update and overwrite at least a portion of said application computer readable program code; and said primary communication computer readable program code causes said programmable computer processor to employ said check code of said primary boot computer readable program code to determine whether said updated application computer readable program code is corrupted.

12. The computer program product tangibly embodied in non-volatile memory of claim 8, wherein:

said primary communication computer readable program code for causing said programmable computer processor to communicate externally with respect to said processor controlled embedded device causes said programmable computer processor to receive an update to communication computer readable program code, and to update and overwrite at least a portion of said backup communication computer readable program code with said update.

13. The computer program product tangibly embodied in non-volatile memory of claim 12, wherein:

said primary communication computer readable program code causes said programmable computer processor to employ said check code of said primary boot computer readable program code to determine whether said updated backup communication computer readable program code is corrupted; and said primary boot computer readable program code, if said updated backup communication computer readable program code is determined to be uncorrupted, causes said programmable computer processor to determine whether said updated backup communication computer readable program code comprises a new version, and, if said updated backup communication computer readable program code comprises a new version, to employ copy code of said updated backup communication computer readable program code to cause said programmable computer processor to copy at least a portion of said backup communication computer readable program code to, and overwrite, at least a portion of said primary communication computer readable program code.

14. The computer program product tangibly embodied in non-volatile memory of claim 8, additionally comprising:
backup boot computer readable program code capable of causing said programmable computer processor to boot said processor system; and
wherein:
said primary communication computer readable program code for causing said programmable computer processor to communicate externally with respect to said processor controlled embedded device causes said programmable computer processor to receive an update to boot computer readable program code, and to update and overwrite at least a portion of said backup boot computer readable program code with said update; and
said primary communication computer readable program code causes said programmable computer processor to employ said check code of said primary boot computer readable program code to determine whether said updated backup boot computer readable program code is corrupted; and
said primary boot computer readable program code, if said backup boot computer readable program code is determined to be uncorrupted, causes said programmable computer processor to determine whether said updated backup boot computer readable program code comprises a new version, and, if said updated backup boot computer readable program code comprises a new version, to employ copy code of said primary and/or said backup communication computer readable program code to cause said programmable computer processor to copy at least a portion of said backup boot computer readable program code to, and overwrite, at least a portion of said primary boot computer readable program code.

15. A distributed nodal system, comprising:
(A) a source computer processor node, comprising:
a source computer processor;
an interface for communicating with a network; and
at least one nonvolatile memory storing computer readable program code for at least one target computer processor node; and
(B) at least one target computer processor node for a processor controlled embedded device, said embedded device comprising at least one operational element, said target computer processor node comprising:
a slave computer processor for controlling said at least one operational element;
an interface for communicating with a network; and
an updatable firmware memory storing computer readable program code for operating said target computer processor, said computer readable program code comprising:

application computer readable program code for causing said target computer processor to control said at least one operational element;
primary communication computer readable program code for causing said target computer processor to communicate with said network at said interface;
backup communication computer readable program code capable of causing said target computer processor to communicate with said network at said interface; said backup communication computer readable program code having copy code for causing said target computer processor to copy computer readable program code from one portion of said updatable firmware memory to another portion of said updatable firmware memory; and
primary boot computer readable program code for causing said target computer processor to boot said target computer processor; said primary boot computer readable program code having check code causing said target computer processor to determine whether said primary communication computer readable program code is corrupted; and
if said primary communication computer readable program code is determined to be corrupted, to employ said copy code of said backup communication computer readable program code to cause said target computer processor to copy at least a portion of said backup communication computer readable program code to, and overwrite, at least a portion of said primary communication computer readable program code;
else, if said primary communication computer readable program code is determined to be uncorrupted, to determine whether said application computer readable program code is corrupted;
if said application computer readable program code is determined to be uncorrupted, to set a flag indicating that said application computer readable program code is uncorrupted;
else, if said application computer readable program code is determined to be corrupted, to prevent execution of said application computer readable program code.

16. The distributed nodal system of claim 15, wherein:
said at least one target computer processor node primary communication computer readable program code for causing said target computer processor to communicate with said network causes said target computer processor receive an update to said application computer readable program code from said source computer processor node via said network at said interface, and to update and overwrite at least a portion of said application computer readable program code; and
said at least one target computer processor node primary communication computer readable program code causes said target computer processor to employ said check code of said primary boot computer readable program code to determine whether said updated application computer readable program code is corrupted.

17. The distributed nodal system of claim 15, wherein:
said at least one target computer processor node primary communication computer readable program code for causing said target computer processor to communicate with said network causes said target computer processor:

to receive an update to said communication computer readable program code from said source computer processor node via said network at said target interface; and to update and overwrite at least a portion of said backup communication computer readable program code with said update.

18. The distributed nodal system of claim 17, wherein:

said at least one target computer processor node primary communication computer readable program code causes said target computer processor to employ said check code of said primary boot computer readable program code to determine whether said updated backup communication computer readable program code is corrupted; and said at least one target computer processor node primary boot computer readable program code, if said updated backup communication computer readable program code is determined to be uncorrupted, causes said target computer processor to determine whether said updated backup communication computer readable program code comprises a new version, and, if said updated backup communication computer readable program code comprises a new version, to employ copy code of said updated backup communication computer readable program code to cause said target computer processor to copy at least a portion of said backup communication computer readable program code to, and overwrite, at least a portion of said primary communication computer readable program code.

19. The distributed nodal system of claim 15, wherein:

said at least one target computer processor node additionally comprises backup boot computer readable program code for causing said target computer processor to boot said processor system; and said at least one target computer processor node primary communication computer readable program code for causing said target computer processor to communicate with said network causes said target computer processor:

to receive an update to boot computer readable program code; and to update and overwrite at least a portion of said backup boot computer readable program code with said update.

20. The distributed nodal system of claim 17, wherein:

said at least one target computer processor node primary communication computer readable program code causes said target computer processor to employ said check code of said primary boot computer readable program code to determine whether said updated backup boot computer readable program code is corrupted; and said at least one target computer processor node primary boot computer readable program code, if said backup boot computer readable program code is determined to be uncorrupted, causes said target computer processor to determine whether said updated backup boot computer readable program code comprises a new version, and, if said updated backup boot computer readable program code comprises a new version, to employ copy code of said primary and/or said backup communication computer readable program code to cause said target computer processor to copy at least a portion of said backup boot computer readable program code to, and overwrite, at least a portion of said primary boot computer readable program code.

* * * * *